US012466239B2

(12) United States Patent
Palombo et al.

(10) Patent No.: US 12,466,239 B2
(45) Date of Patent: Nov. 11, 2025

(54) ELECTRIC OR HYBRID TRACTION VEHICLE EQUIPPED WITH AN AIR CONDITIONING SYSTEM, WITH HEAT RECOVERY FROM COOLING OF ELECTRICAL AND/OR ELECTRONIC COMPONENTS

(71) Applicants: HITACHI RAIL STS S.P.A., Naples (IT); Adolfo Palombo, Naples (IT); Annamaria Buonomano, San Felice a Cancello (IT); Giovanni Barone, Naples (IT); Cesare Forzano, Naples (IT)

(72) Inventors: Adolfo Palombo, Naples (IT); Annamaria Buonomano, San Felice a Cancello (IT); Giovanni Barone, Naples (IT); Cesare Forzano, Naples (IT); Beniamino Cascone, Naples (IT); Pietro Venanzio, Naples (IT)

(73) Assignee: HITACHI RAIL STS S.P.A., Naples (IT)

( * ) Notice: Subject to any disclaimer, the term of this patent is extended or adjusted under 35 U.S.C. 154(b) by 175 days.

(21) Appl. No.: 18/229,925

(22) Filed: Aug. 3, 2023

(65) Prior Publication Data

US 2025/0042223 A1 Feb. 6, 2025

(51) Int. Cl.
*B60H 1/22* (2006.01)
*B60H 1/00* (2006.01)
(Continued)

(52) U.S. Cl.
CPC ....... *B60H 1/2215* (2013.01); *B60H 1/00321* (2013.01); *B60H 1/004* (2013.01);
(Continued)

(58) Field of Classification Search
CPC .. B60H 1/2215; B60H 1/00321; B60H 1/004; B60H 1/00885; B60H 1/039; B60H 1/143; B60H 2001/00307
See application file for complete search history.

(56) References Cited

U.S. PATENT DOCUMENTS 7,048,044 B2 * 5/2006 Ban ........................ B60L 50/16
 165/240
7,147,071 B2 * 12/2006 Gering ..................... B60H 1/08
 165/41

(Continued)

FOREIGN PATENT DOCUMENTS

DE 19914565 10/2000
DE 102017124811 B4 * 8/2020 ............... B60H 1/00
(Continued)

OTHER PUBLICATIONS

Italian Search Report and Written Opinion in IT Application No. 202100003755 mailed Oct. 29, 2021 (7 pages) (an English translation attached herewith).
(Continued)

*Primary Examiner* — Ljiljana V. Ciric
(74) *Attorney, Agent, or Firm* — Leason Ellis LLP (57) ABSTRACT

An electric or hybrid traction vehicle is provided with a passenger compartment conditioned using an air conditioning system, and with electrical/electronic components which are cooled by a waste heat dissipation and recovery system; such system transfers the recovered heat to an additional heat exchanger for heating and/or post-heating an air flow, which is conveyed towards the passenger compartment via an aeraulic duct; the additional exchanger is arranged in series with, and downstream of, an evaporator of a refrigerating assembly, which cools the air flow in the aeraulic duct.

11 Claims, 5 Drawing Sheets

(51) Int. Cl.
   *B60H 1/03*   (2006.01)
   *B60H 1/14*   (2006.01)
(52) U.S. Cl.
   CPC ......... *B60H 1/00885* (2013.01); *B60H 1/039* (2019.05); *B60H 1/143* (2013.01); *B60H 2001/00307* (2013.01)

(56) References Cited

U.S. PATENT DOCUMENTS

| | | | |
|---|---|---|---|
| 7,931,209 B2 | 4/2011 | Ricerche | |
| 8,448,696 B2* | 5/2013 | Johnston | B60L 58/27 165/917 |
| 9,156,333 B2* | 10/2015 | Yahia | B60H 1/08 |
| 10,315,493 B2 | 6/2019 | Vespa et al. | |
| 10,406,889 B2* | 9/2019 | Sakamoto | F25B 47/02 |
| 10,987,997 B2* | 4/2021 | Hötzel | B60H 1/32281 |
| 10,994,587 B2* | 5/2021 | Zenner | B60H 1/143 |
| 11,383,583 B2* | 7/2022 | Kozasa | H01M 10/625 |
| 11,858,309 B2* | 1/2024 | Song | B60H 1/00278 |
| 12,043,090 B2* | 7/2024 | Kyuto | F25B 6/04 |
| 2003/0221820 A1* | 12/2003 | Drucker | B60H 3/024 165/42 |
| 2007/0214819 A1* | 9/2007 | Patel | B60H 1/00028 62/239 |
| 2008/0251235 A1* | 10/2008 | Zhou | B60L 58/26 165/59 |
| 2009/0024256 A1* | 1/2009 | Adams | H01M 10/633 320/136 |
| 2013/0319029 A1* | 12/2013 | Sekiya | F25B 25/005 62/238.7 |
| 2014/0041826 A1* | 2/2014 | Takeuchi | B60L 1/08 165/10 |
| 2015/0101789 A1* | 4/2015 | Enomoto | B60H 1/039 236/35 |
| 2016/0129756 A1* | 5/2016 | Enomoto | B60H 1/22 62/244 |
| 2019/0299738 A1* | 10/2019 | Conti | B60H 1/00278 |
| 2023/0091458 A1* | 3/2023 | Suzuki | B60H 1/3204 62/132 |
| 2023/0356564 A1* | 11/2023 | Dong | B60H 1/00907 |
| 2024/0092139 A1* | 3/2024 | Yun | B60H 1/00907 |
| 2024/0140163 A1* | 5/2024 | Mancini | B60H 1/32281 |
| 2024/0270046 A1* | 8/2024 | Yun | B60H 1/00392 |
| 2025/0042223 A1* | 2/2025 | Palombo | B60H 1/00885 |

FOREIGN PATENT DOCUMENTS

| | | | | |
|---|---|---|---|---|
| DE | 102019119366 A1 * | 1/2021 | | B60H 1/00278 |
| DE | 112020004423 T5 * | 6/2022 | | B60H 1/00278 |
| DE | 102018129393 B4 * | 10/2022 | | B60H 1/00885 |
| EP | 3498513 | 6/2019 | | |
| EP | 4046834 | 8/2022 | | |
| IT | 202100003755 | 8/2022 | | |
| WO | WO-2019082570 A1 * | 5/2019 | | B60H 1/00007 |
| WO | 2020104278 | 5/2020 | | |

OTHER PUBLICATIONS

European Search Report and Written Opinion in EP Application No. 22157488.2-1012 mailed Jul. 25, 2022 (5 pages) (an English translation attached herewith).

* cited by examiner

ELECTRIC OR HYBRID TRACTION VEHICLE EQUIPPED WITH AN AIR CONDITIONING SYSTEM, WITH HEAT RECOVERY FROM COOLING OF ELECTRICAL AND/OR ELECTRONIC COMPONENTS

TECHNICAL FIELD

The present invention refers to an electric traction or to a hybrid traction vehicle, provided with an air conditioning system, for conditioning a passenger compartment of the vehicle. In particular, the present invention refers to a railway vehicle, for example to a train, without losing generality since it may also be applied to road vehicles, naval vehicles, etc. . . . .

BACKGROUND

From patent application No. DE19914565A1, the possibility is known to use heat produced by a converter device for heating, during the winter period, an air flow which is sent, by means of a fan, to a passenger compartment of a vehicle. The transfer of the heat from the converter device to the passenger compartment allows for reducing the energy consumptions for heating the passenger compartment.

In particular, the fan conveys external air, or recirculated air from the passenger compartment, or an adjustable mixture of external air and recirculated air, to a heating unit supplied with a thermal exchange fluid which removes heat from the converter device. By means of such system, it is possible to control the thermal comfort of the occupants during the heating winter period only.

The need is felt to perfect the known solutions of this type in order to achieve optimum conditions of air quality and of comfort of the people in the passenger compartment also in the summer period. In particular, it is advisable to ensure the comfort both from the point of view of the temperature (the so-called thermal comfort) and from the point of view of the humidity (the so-called hygrometric comfort). The control of the humidity, in turn, allows for ensuring the conditions of "Indoor Air Quality" (IAQ) required by the American standard Ashrae 62.1 for preventing the development of pathogens inside the passenger compartment.

U.S. Pat. No. 10,315,493B2 illustrates a vehicle according to the preamble of claim 1, wherein a three-way regulating valve receives a coolant coming from a heat source, recovered from electrical components. Such valve is controlled for splitting the coolant between two circuit branches, in parallel to one another, having respective heat exchangers: one of such exchangers heats air sent into the passenger compartment, whereas the other one is cooled by external air. This solution requires a tank for mixing the parts of coolant which flow in the two circuit branches, before returning to the heat source.

SUMMARY

The object of the present invention is to manufacture an electric or hybrid traction vehicle provided with an air conditioning system, with heat recovery from the cooling of electrical and/or electronic components, which allows for satisfying in a simple and cost-effective manner the above-described needs and which perfects the solution shown in U.S. Pat. No. 10,315,493B2.

According to the present invention, an electric or hybrid traction vehicle is provided, as defined in the appended claims.

With such system, in a simple and cost-effective manner, it will be possible to obtain an economically reasonable heating of the treated air, in order to ensure:
i) lower energy consumptions during the season when heating is necessary (the service provided to the users being equal);
ii) a better thermo-hygrometric comfort of the occupants, and a better internal air quality, during the hot or summer season, thanks to the control of the environment relative humidity (in such case, as described in detail in the following, it will be necessary to cool and dehumidify the air more than in the standard case).

BRIEF DESCRIPTION OF THE DRAWINGS

For a better understanding of the invention, a preferred embodiment is described herein, by way of example and not limited to the railway field, with the aid of the accompanying drawings, wherein.

DESCRIPTION OF EMBODIMENTS

Figure 1:
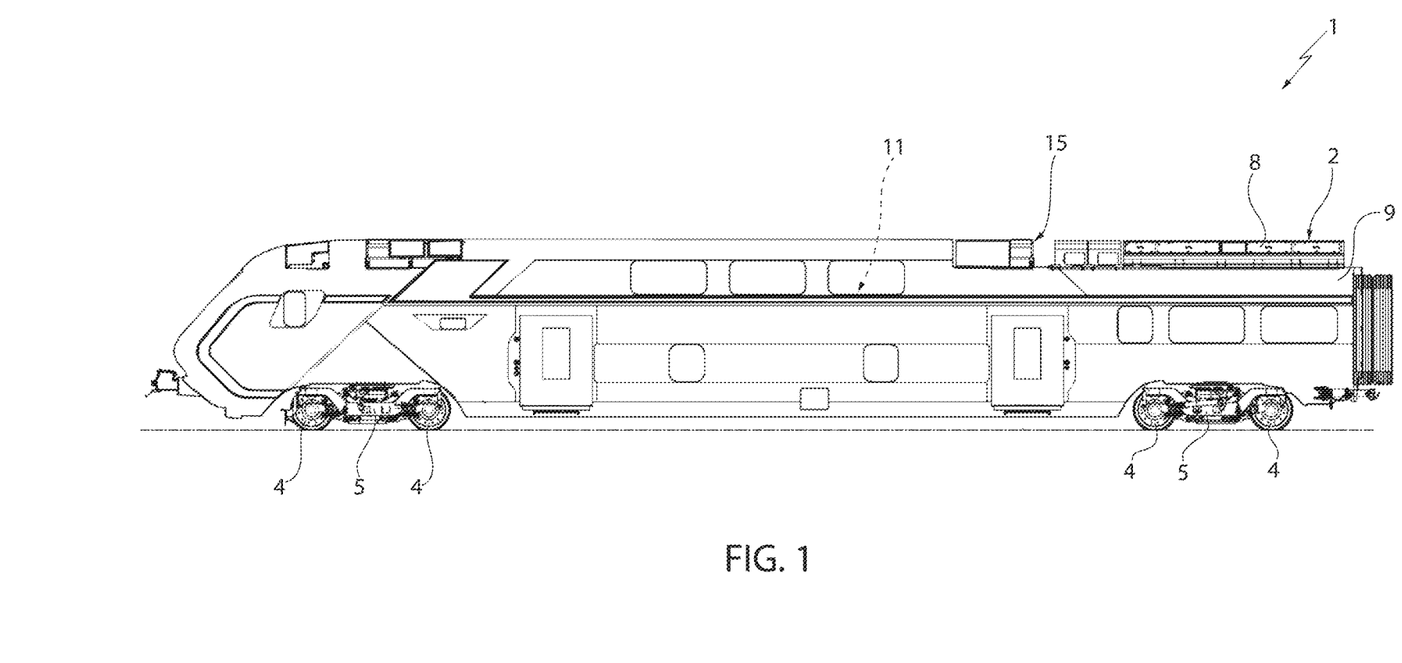
FIG. 1 is a side view of a preferred embodiment of the electric or hybrid traction vehicle provided with an air conditioning system for conditioning a passenger compartment, with heat recovery from electrical and/or electronic components, according to the present invention.

With reference to FIG. 1, reference numeral 1 indicates a vehicle, defined in the specific case by a passenger car of a train. More in general, the present invention applies not only to trains, but to any electric traction vehicle, or to any hybrid traction vehicle (for example, ships, buses, etc.) with an electric drive coupled to another traction source.

The passenger car 1 is, in particular, a head passenger car of the train and comprises an electric drive 2, having at least one electric motor or an electric motor-generator (not illustrated) for mechanically operating the wheels 4 of at least one truck 5, which is provided underneath a floor of the passenger car 1.

The vehicle 1 has electronic and/or electrical components which require cooling, generally indicated by reference numeral 8 in FIG. 1.

The electrical/electronic components 8, in the specific case illustrated, are defined by power electronic converters 10, for converting, transforming and/or transferring electric energy for the motor or motor-generator.

In the considered example, the electric drive 2 is of known type, therefore it is not described in detail. In particular, the power electronic converters 10, such as for example inverters (schematized in FIG. 2), receive electric energy from a catenary or from an electrified line installed on the ground or from another source (not illustrated) and transform the electric energy so as to operate one or more electric motors for towing the vehicle 1. Preferably, in the illustrated example, the power electronic converters 10 are arranged on a roof or deck 9 of the passenger car 1 (FIG. 1).

According to a variant not illustrated, in combination with or in alternative to the drawing of electric energy from a catenary or from a ground electrified line, the passenger car 1 comprises an autonomous electric energy source defined by a battery (not illustrated), which is connected to the power electronic converters 10 for feeding, and preferably also receiving and stocking, electric current in direct current.

The passenger car 1 comprises at least one passenger compartment 11 accessible by passengers, driver, operators, etc., through one or more doors. The passenger compartment 11 is conditioned for satisfying the needs of air quality and of thermal or thermo-hygrometric comfort during the journeys. In other words, the passenger compartment 11 has air temperature conditions and, in summer, also relative humidity conditions that can be adjusted by means of an air conditioning system 15, schematically illustrated in FIG. 2.

Figure 2:
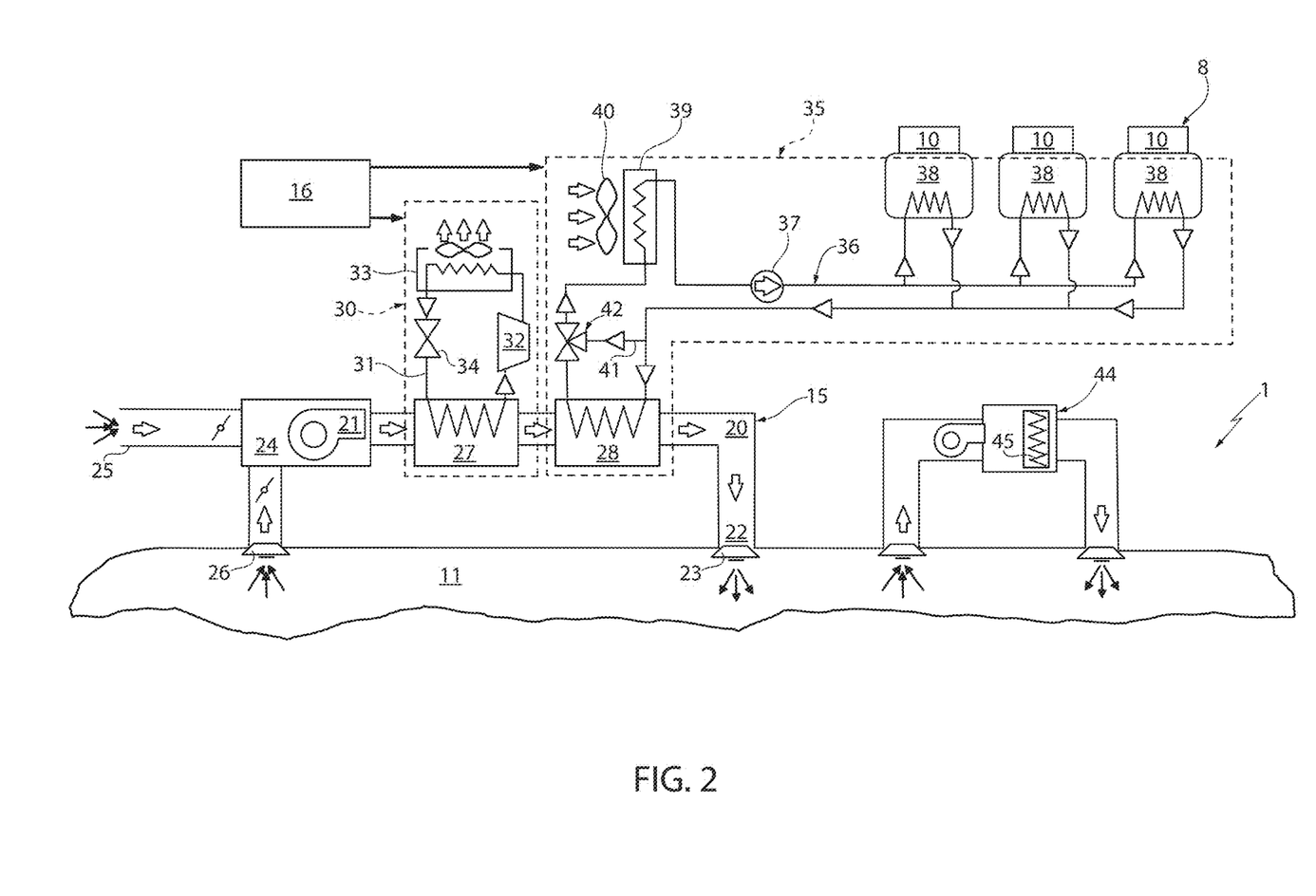
FIG. 2 is a diagram that shows the air conditioning system provided on the vehicle of FIG. 1.

With reference to such FIG. 2, the air conditioning system 15 comprises a control unit 16 and a plurality of sensors (of known type and not illustrated), arranged inside the passenger compartment 11 and/or at the external atmosphere and/or at ducts/exchangers/devices of the system 15 for sending, to the control unit 16, signals indicative of the conditions/properties of the air outside and inside the passenger compartment 11 (for example: temperature, relative humidity, flow rate, concentration of carbon dioxide, etc.) and conditions/properties of the used thermal exchange fluids (for example: temperature, pressure, flow rate, etc.).

Figure 3:
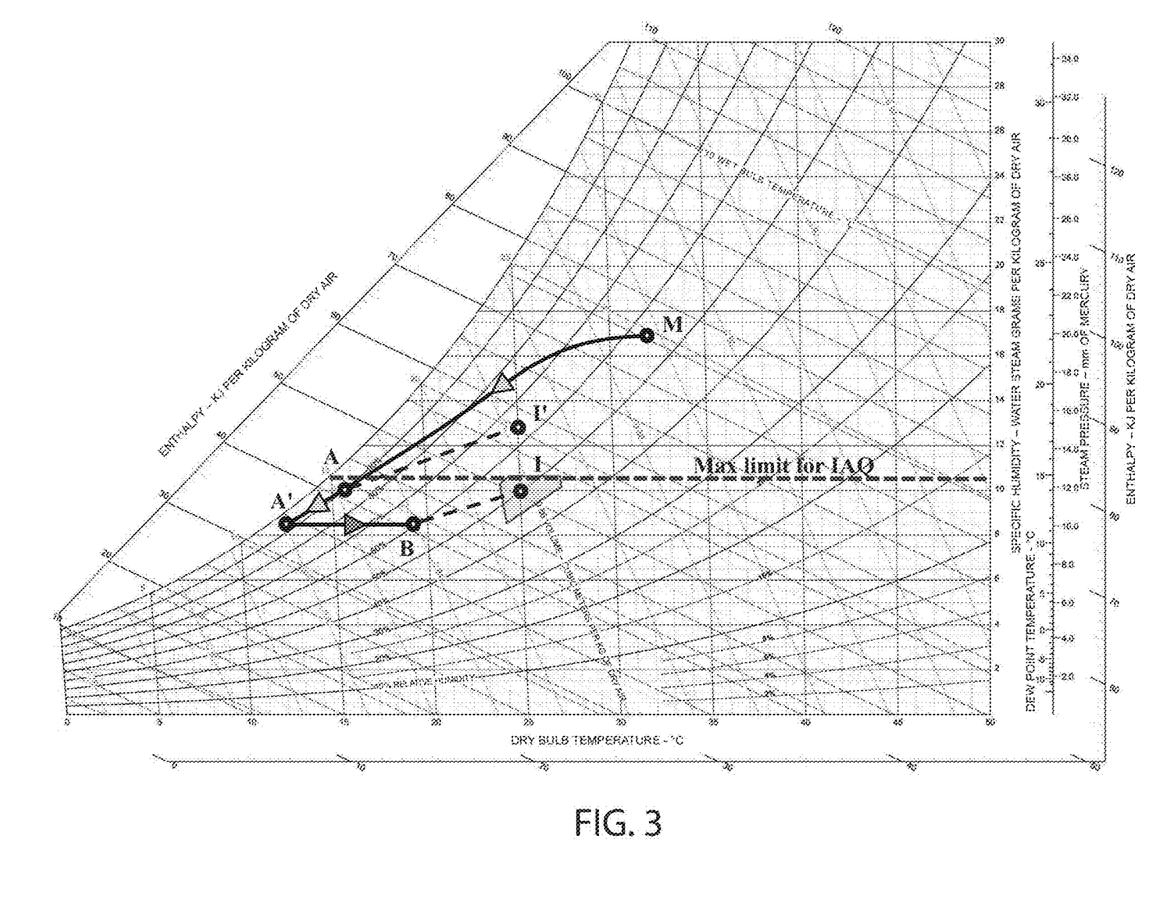
FIG. 3 is a psychrometric diagram that shows, by way of example, the operation and the thermodynamic transformations of the humid air for the air conditioning system of FIG. 2 in a general summer operating mode.

The control unit 16 is configured, by means of control algorithms (in open loop or preferably in closed loop), to adjust the thermal exchanges in the air conditioning system 15 in order to achieve:
- a given dry bulb temperature setpoint inside the passenger compartment 11, called TSet, typically comprised between 21 and 31° C.;
- in a so-called "summer" period, also a relative humidity setpoint, called RHset, normally desired by the users and typically included between 45% and 55% (50%±10%, see the corresponding highlighted area in FIG. 3).

Furthermore, the American standard Ashrae 62.1 ("Ventilation for indoor air quality") of 2019 recommends, for the purposes of the air quality (for preventing the proliferation of pathogens), maintaining the conditioned environments below the dew point of 15° C., corresponding to a specific humidity of the internal air of 10.5 $g_v/kg_a$ (horizontal broken line in FIG. 3); it should be noted that such requirement is easily achievable by adopting the system which is proposed according to the present invention: in fact, in practice, in order to remain below the abovementioned specific humidity, it is sufficient to maintain suitable dry bulb temperature and relative humidity values (for example for a dry bulb temperature of 25° C., it is sufficient to maintain a relative humidity around 50% for simultaneously obtaining summer thermo-hygrometric wellness conditions and air quality inside the passenger compartment).

The system 15 comprises an aeraulic duct 20 which, in use, conveys a forced air flow into the passenger compartment 11. Such flow is obtained through the action of at least one fan 21. The duct 20 is provided, at an outlet 22 that leads to the passenger compartment 11, with a plurality of blowers or diffusers 23 arranged in positions spaced from one another (in FIG. 2, for the sake of simplicity, only one of the diffusers 23 is shown).

The system 15 preferably comprises a mixer 24 of known type, arranged at an initial length of the duct 20 and communicating, by means of respective inlets, 25 and 26, with the outer environment and with the passenger compartment 11 so as to be able to mix an external air flow with an air flow coming from the passenger compartment 11. The adjustment of the mixing is controlled by the control unit 16 in a known manner and not described in detail, for example by choking the opening of the inlets 25 and 26.

More preferably, the fan 21 constitutes part of the mixer 24, but it could also be provided in the duct 20 downstream of the mixer 24 (considering the forward direction of the air); or two fans could be provided, one for the air sucked through the inlet 25, and the other one for the air sucked through the inlet 26.

The system 15 further comprises two heat exchangers, 27 and 28, respectively called "cold battery" and "hot battery", arranged one after the other along the duct 20, downstream of the mixer 24.

The exchanger 27, arranged between the mixer 24 and the exchanger 28, is provided for cooling and dehumidifying the air flow in the duct 20, and in particular defines the evaporator of a refrigerating assembly 30. The latter, if of the steam compression type, in general comprises a circuit 31 in which a refrigerant fluid flows; a compressor 32; a heat exchanger 33 (condenser); a lamination valve 34.

Whereas, the exchanger 28 constitutes part of a waste heat dissipation and recovery system 35 produced by the power electronic converters 10. In general, it will be possible to apply the system 35 to electronic/electrical components 8 which are different from the power electronic converters 10 indicated herein by way of example, but which require to be cooled during the relative operation.

The system 35 comprises a circuit 36, in which a thermal exchange fluid flows (for example liquid water), and a circulation pump 37.

It should be noted that the exchanger 28, which acts as "hot battery" for heating or post-heating the treated air, is an additional component with respect to the traditional system layouts that do not provide for heat recovery from electrical/electronic components 8, whereas such recovery in the present invention is obtained by means of the system 35.

The system 35 further comprises at least one heat exchanger 38 arranged along the circuit 36 for removing heat from the electrical/electronic components 8, heat which will then be recovered and transferred through the exchanger 28 to the air flow to be heated in the duct 20.

The exchanger 38 removes heat from the power electronic converters 10, but as abovementioned it could remove heat from other types of electrical/electronic components 8 which naturally tend to heat up during their normal use and thus require cooling. For example, heat could be removed from an electrical battery, if provided. In the particular example illustrated in FIG. 2, the set of the exchanger 38 and the power electronic converter 10 (or, more in general, the set of the exchanger 38 and the electrical/electronic component 8) forms one single apparatus.

Clearly, the fact of recovering the heat which is produced by at least one electrical and/or electronic component allows for reducing the energy consumptions necessary for heating, in the cold or winter period, the air flow conveyed from the duct 20 towards the passenger compartment 11. During the hot or summer period, with the same system 35, a better air quality and a better comfort of the occupants is instead obtained through the control of the relative humidity in the passenger compartment 11 (otherwise not obtained in traditional system layouts).

Furthermore, the performances and the operating conditions of the power electronic converters 10 improve, thanks to a more effective removal of the heat to be dissipated in the case of the system 35 proposed according to the present invention.

The position of the exchanger 38 is determined by the layout provided on the vehicle for the power electronic converters 10 and/or for any other electrical/electronic components 8 that are cooled by the exchangers 38 of the system 35.

In the specific case illustrated, the apparatuses comprising the exchangers 38 are arranged on the roof or deck 9 (FIG. 1).

The system 35 further comprises a radiator 39 arranged along the circuit 36, and passed through, in use, by external air, which preferably is forcedly made to circulate by means of at least one fan 40, in order to discharge the part of heat which is in excess, i.e. the part of heat which is produced by the power electronic converters 10 but which is not used for heating the air in the duct 20.

In the specific example, the radiator 39 and the fan 40 thereof are arranged on the roof or deck 9 (FIG. 1).

Still with reference to FIG. 2, in order to adjust the heat transmitted to the exchanger 28, the system 35 comprises a bypass pipe 41, in parallel to the exchanger 28, and a three-way regulating valve 42, arranged along the circuit 36 at one of the two points of intersection between the pipe 41 and the circuit branch where the exchanger 28 is arranged. In particular, the valve 42 is arranged in the point of intersection downstream of the exchanger 28 and of the pipe 41 (the term "downstream" is determined by the direction of the flow, which in turn is determined by the pump 37). The valve 42 is electrically actuated under the command of the control unit 16.

Thanks to such valve 42, the heat removed through the exchangers 38 can be partially or totally directed towards the exchanger 28, by splitting the heat transfer fluid flow rate between the exchanger 28 and the pipe 41, depending on the thermal exchanges required, on the basis of the algorithms implemented in the control unit 16. It should be noted that the valve 42, as well as the exchanger 28, are additional components with respect to the traditional system layouts devoid of heat recovery.

According to the present invention, as shown in FIG. 2, the radiator 39 is arranged in series, downstream with respect to the pipe 41 and to the exchanger 28, and upstream with respect to the exchangers 38. Therefore, the heat transfer liquid flow rate in the pipe 41 joins with the one that flows through the exchanger 28, at the downstream point of intersection (where the valve 42 is arranged, in the specific example illustrated), and the entire flow rate flows towards the radiator 39. Thanks to the positioning in series of the radiator 39, the thermal exchange is adjusted in a relatively simple manner, in order to obtain the suitable temperature entering the exchangers 38. Furthermore, the arrangement of the circuit according to the present invention does not require any tank for mixing the two parts of liquid coming from the exchanger 28 and from the pipe 41.

In the particular example illustrated in FIG. 2, the fluid flow rate always flows through the radiator 39, which is never excluded from the circuit, before arriving at the exchangers 38. Whereas, according to the variant shown in FIG. 5, the radiator 39 can be bypassed: in fact, the circuit 36 comprises a bypass line 41a, in parallel to the radiator 39, and a three-way regulating valve 43 controlled by the control unit 16 so as to vary the heat removed from the radiator 39 and thus the temperature entering the exchangers 38, by splitting the heat transfer liquid flow rate between the radiator 39 and the line 41a.

According to a preferred aspect of the present invention, the control unit 16 simultaneously adjusts the system 35 and the refrigerating assembly 30, also in the summer period, so as to achieve the temperature setpoint (Tset) and the air relative humidity setpoint (RHset) in the passenger compartment 11.

During the summer period, the temperature setpoint is represented, for example, by the abscissa value of points I and I' in FIG. 3, wherein the transformations to which the treated air is subjected are shown in a Mollier psychrometric diagram for the humid air.

In the particular case considered, the temperature setpoint is of about 25° C., but it could possibly be different (typically, the temperature and humidity setpoints can be freely chosen so as to be within the area highlighted in FIG. 3, which corresponds to thermo-hygrometric wellness conditions of the occupants, and also to air quality conditions inside the passenger compartment).

Assuming to leave the exchanger 28 (i.e. the additional exchanger, or post-heating battery, of the system 35) switched off in the summer period, all the waste heat coming from the exchanger 38 is dissipated by the radiator 39: if desiring to achieve the temperature setpoint starting from point M in the diagram (i.e. starting, for example, from a condition in which the air to be treated, after the mixing between the external air and the recirculated air, has a temperature of about 32° C. and a relative humidity of 57%), it is necessary to cool and dehumidify the air flow flowing in the duct 20 through the exchanger 27 up to achieving point A, following a transformation, in which cooling and dehumidifying are obtained.

The treated air, flowing along the duct 20, through the exchanger 27 up to the passenger compartment 11, is introduced in the environment in the conditions identified by point A in the diagram of FIG. 3.

In the assumption that the exchanger 28 is switched off, by letting in the air in such conditions, the air present in the passenger compartment 11 changes its thermo-hygrometric conditions reaching the conditions identified by point I', where the temperature actually corresponds to the set setpoint, but:
i) the specific humidity can exceed the maximum value of 10.5 $g_v/kg_a$ recommended by the standard Ashrae 62.1 for the purposes of the internal air quality;
ii) the relative humidity can be higher than the maximum limit typically considered for the purposes of the thermo-hygrometric wellness of the users (typically 55%).

Such occurrences are illustrated in FIG. 3.

In order to overcome these drawbacks and reduce the relative humidity, according to an aspect of the present invention, the temperature setpoint being equal, the control unit 16 adjusts the refrigerating assembly 30 in such a manner that the heat removed by means of the exchanger 27 is greater than the heat that would be theoretically removed leaving the exchanger 28 switched off.

Simultaneously, the control unit 16 adjusts the system 35 (by means of the valve 42) in such a manner that the exchanger 28 transfers the heat removed from the electrical/electronic components 8 to the air flow in the duct 20 for achieving, inside the passenger compartment 11, besides the temperature setpoint, also an environment humidity value that can ensure at the same time suitable levels of hygrometric comfort and of air quality.

This control mode is identified, in the example of FIG. 3, by the achievement of point A' through the cooling and the dehumidifying obtained by means of the exchanger 27, and then by a horizontal stretch (from point A' to point B) defining the post-heating obtained by means of the exchanger 28.

By introducing in the environment the treated air in the conditions identified by point B, the air inside the passenger compartment 11 achieves the desired air quality and thermo-hygrometric wellness conditions, identified by point I (which respects the temperature and relative humidity setpoints and the maximum limit of environment specific humidity, respectively equal to 25° C., 50% and 10.5 $g_v/kg_a$).

In order to obtain the previously described result, the control unit 16 is configured by means of the implementation of suitable algorithms to achieve, besides the temperature setpoint, also the environment relative humidity setpoint.

Figure 4:
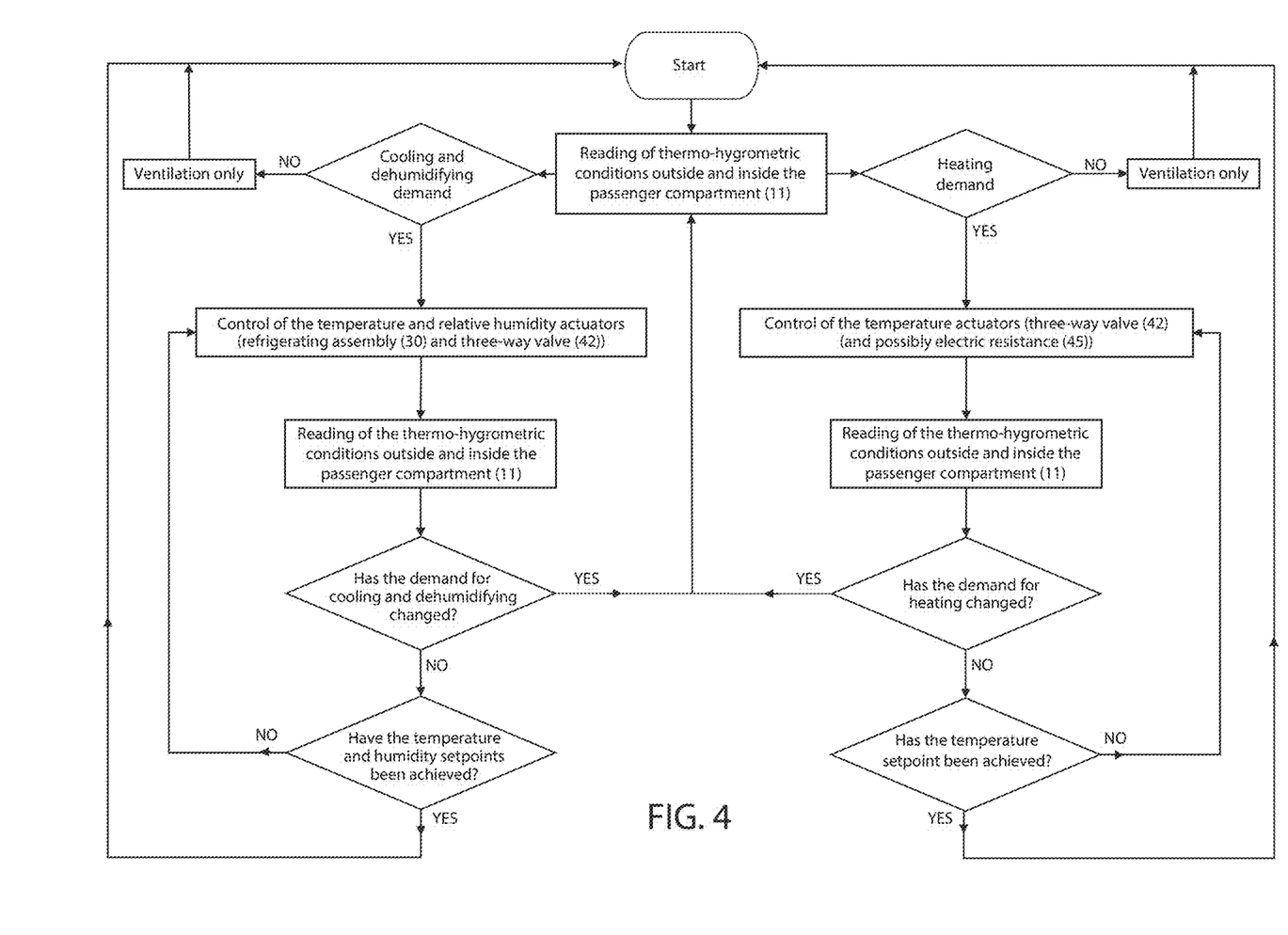
FIG. 4 is a block diagram that shows, in general, the operating logic of the proposed air conditioning system.

Specifically, through the abovementioned algorithms it is possible to determine when (and in what measure) it is necessary to dehumidify and post-heat the air in order to achieve the desired setpoint, as shown by way of example in the flow diagram provided in FIG. 4. The optimum control strategy for controlling, in a coordinated or combined manner, the refrigerating assembly 30 and the valve 42 can vary depending on the considered case (on the basis of the machines used, the setpoints, etc. . . . ): the control strategy to be used will thus be defined each time, on the basis of the specificities of the case.

According to a variant, the speed of the fan 40 is adjusted by the control unit 16, or by another control unit on board the vehicle, so as to increase (at discrete paces, or progressively) upon the increase in the forward speed of the vehicle, thus correlating the air flow rate (and thus the cooling caused by the radiator 39) indirectly to the quantity of energy dissipated by the power electronic converters 10.

The forward speed of the train can be detected by means of one or more speed sensors arranged on board, or can be estimated starting from other quantities measured on board and possibly on the ground, or can be determined remotely and wirelessly transmitted to the vehicle, or could be determined by means of a geolocation system.

With this variant, the speed adjustment of the fan 40 allows for removing less or more heat from the radiator 39 in proportion to how much the power electronic converters 10 dissipate, and to the compatibility with the noise level limits (in the absence of the adjustment of the fan 40, the temperature of the liquid would oscillate according to the performance of the power dissipated by the power electronic converters 10).

More generally, the rotation speed of the fan 40 is adjusted so as to assume two different values depending on the forward speed of the vehicle: a lower rotation speed for forward speeds that are null and/or below a pre-established threshold (given the possible stringent noise limits and the reduced powers to be dissipated); whereas, a higher rotation speed when the forward speed is above said threshold.

Figure 5:
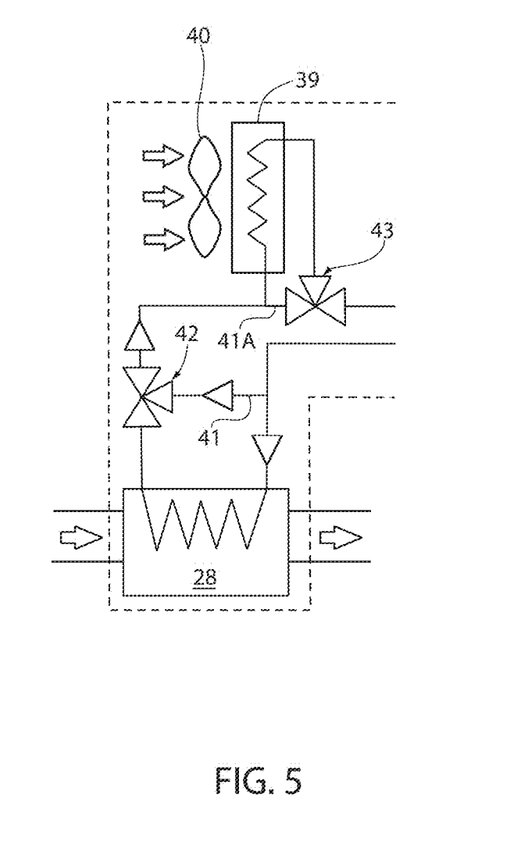
FIG. 5 is a detail relative to a variant of the diagram of FIG. 2.

According to the variant of FIG. 5, it is possible to adjust the heat quantity available to the exchanger 28 (for heating, during the cold season, or for post-heating, during the hot season, the air to be introduced in the passenger compartment 11) by varying the heat quantity removed in the radiator 39, in addition to the flow rate adjustment carried out by the valve 42. The adjustment of the removal of heat can be carried out with at least one of the following modes:
by varying the rotation speed of the fan 40;
by splitting the heat transfer fluid flow rate between the radiator 39 and the line 41a, by means of the valve 43.

Preferably, the control strategy provides for the following operations. When the complete opening of the valve 42 towards the exchanger 28 is not sufficient for ensuring the required heat and achieving the temperature setpoint, the control unit 16 first reduces the speed of the fan 40 so as to reduce the heat removed and thus increase the temperature of the heat transfer fluid upstream and downstream of the exchangers 38 (compatibly with the technological limits required by the power electronic converters 10). Should the heat available to the exchanger 28 continue to be insufficient for achieving the temperature setpoint of the air, despite the increase in temperature of the heat transfer liquid, also after zeroing the speed of the fan 40, the control unit 16 starts intervening on the valve 43 so as to reduce the heat transfer fluid flow rate to the radiator 39 and deviate it along the line 41a, up to the complete bypass of the radiator 39 if necessary. In this manner, the heat removed from the radiator 39 is further reduced, hence the temperature of the heat transfer fluid to the exchangers 38 still increases, in order to make greater heat available at the exchanger 28 (as long as this increase is compatible with the maximum temperature admitted to the power electronic converters 10: in negative case, the valve 43 and/or the fan 40 are not adjusted). In particular, the temperature of the heat transfer fluid is controlled by the control unit 16 by means of suitable temperature probes to be installed at the entrance and at the exit of the set of exchangers 38.

According to variants, not illustrated, the radiator 39 can be replaced by a liquid/liquid heat exchanger. In particular, in the case of naval means, the cooling can be carried out by means of sea/lake/river water. In these cases, the adjustment for discharging the residual thermal load of the electrical/electronic components 8 is obtained by varying the speed of a pump that feeds the abovementioned exchanger with the sea/lake/river water (in a manner similar to the adjustment of the fan 40).

Still with reference to FIG. 2, the system 15 comprises an additional heating device 44, of known type and not described in detail, comprising one or more electric resistances 45, for example placed inside the passenger compartment. The device 44 is passed through by natural or forced convention by an air flow, so as to obtain, in the passenger compartment 11, the temperature setpoint in a relatively rapid timeframe during the winter period, when the vehicle is still and/or the power electronic converters 10 are not sufficiently hot for producing heat usable by the exchanger 28 of the system 35 in a sufficient quantity for heating the passenger compartment 11.

Based on the foregoing, it is evident that the system 15, with respect to the known solutions, allows for obtaining:
in winter (or, more in general, in relatively cold external temperature conditions), thermal comfort conditions, for the users accommodated in the passenger compartment 11, through an energy saving system, provided by means of the recovery of thermal energy and obtained through the heat exchanger 28 installed in the duct 20;
in summer (or, more in general, in relatively hot external temperature conditions), optimum conditions of air quality and of thermo-hygrometric comfort (obtained by means of the exchangers 27 and 28 in series, which respectively suitably cool and heat the air flow directed towards the passenger compartment 11);
in both seasons, an optimum control of the temperature of the heat transfer fluid flowing in the circuit 36, by means of the adjustment of the valve 42 and preferably by means of the additional adjustment of the fan 40 and/or of the valve 43, in order to maximize the thermal recovery, nevertheless respecting the restrictions relative to the limit temperatures of the power electronic converters 10.

In particular, the system 15 is managed by the control unit 16 so as to simultaneously control the thermal exchange in the exchangers 27 and 28, in order to achieve not only the temperature setpoint (Tset), but also the relative humidity setpoint (RHset) during the summer season only.

Specifically, in the summer regime, the air coming out of the exchanger 27 is in conditions near those of saturation. Consequently, in order to maintain the correct environment hygrometric conditions (RHset), upon the varying of the external relative humidity, the temperature of the air exiting the exchanger 27 has to be maintained constant at the value of point A' (FIG. 3). This can be obtained in feedback by means of a temperature sensor, of known type, placed downstream of the exchanger 27, which communicates the temperature value detected at the control unit 16. The control unit 16 thus adjusts the cooling system 30. During the same summer regime, the temperature setpoint (Tset) is ensured thanks to a temperature sensor of known type alternatively placed in the passenger compartment 11 or in the suction duct of the inlet 26. Upon the decreasing (increasing) of the internal temperature of the air, the control unit 16 increases (decreases) the heat provided to the exchanger 28 adjusting the valve 42, and possibly the valve 43 and/or the fan 40. In a similar manner, during the winter season, upon the increasing (decreasing) of the environment temperature, the control unit 16 decreases (increases) the heat provided to the exchanger 28 adjusting the valve 42, and possibly the valve 43 and/or the fan 40.

In particular, in the specific variant of FIG. 5, as mentioned above, four different adjustment levels are provided:

if the heat provided by the exchanger 28 to the air is sufficient for achieving the setpoint (Tset) conditions, the control unit 16 continuously adjusts the valve 42 only;

if the heat provided by the exchanger 28 to the air is insufficient for achieving the setpoint (Tset) conditions, the control unit 16 reduces the speed of the fan 40 for increasing the temperature of the heat transfer fluid at the exchangers 38;

if the heat provided by the exchanger 28 to the air is still insufficient, the fan 40 is stopped by the control unit 16; furthermore, the control unit 16 adjusts the valve 43 for reducing the heat transfer fluid flow rate to the radiator 39 (up to its complete bypass), compatibly with the maximum temperature admitted to the power electronic converters 10; the exclusion of the radiator 39 prevents an undesired cooling of the heat transfer fluid in the radiator 39 due to convective effects; in particular, the adjustment is carried out on the basis of the detections of temperature probes present at the entrance and at the exit of the exchangers 38;

if the heat provided by the exchanger 28 to the air is still insufficient, the control unit 16 activates the device 44.

It is thus evident that the resistors 45 of the device 44 are used only as final possibility of intervention, preferring the heat recovery from the electrical/electronic components for heating the air in the passenger compartment.

It should be noted that the example shown in FIG. 3 highlights how in the summer period, through the proposed system:

the refrigerating assembly 30 is controlled so as to cool the air more than what would be necessary for achieving the temperature setpoint only, and the exchanger 28 is adjusted for post-heating the air with recovered waste heat, right after the cooling and the dehumidifying obtained by means of the exchanger 27, so as to achieve thermo-hygrometric conditions in the passenger compartment 11 such to ensure optimum levels of air quality and comfort of the occupants.

However, it is understood that various modifications and improvements can be made to the system 15 without departing from the scope of protection defined in the appended claims.

For example, the system 15 could be installed on road vehicles, and not on railway vehicles, or also on naval means with electric or hybrid propulsion.

Furthermore, the device 44 could also be directly installed in the duct 20, downstream of the exchanger 28.

The invention claimed is:

1. An electric or hybrid traction vehicle (1), comprising:
a passenger compartment (11);
an air conditioning system (15) for conditioning said passenger compartment (11) by means of at least one air flow;
at least one electrical and/or electronic component (8) which tends to heat up during normal operating conditions;
the air conditioning system (15) comprising:
a waste heat dissipation and recovery system (35) comprising:
a) a first circuit (36), in which a heat transfer fluid flows, in use;
b) a first heat exchanger (38) for removing heat from said electrical and/or electronic component (8); and
c) at least one second heat exchanger (28) for transferring the heat removed by said first heat exchanger (38) to said air flow;
an aeraulic duct (20) conveying said air flow towards said passenger compartment (11);
a refrigerating assembly (30) comprising a third heat exchanger or evaporator (27), arranged along said aeraulic duct (20) and configured to remove heat from said air flow;
said second heat exchanger (28) being arranged along said aeraulic duct (20) in series with, and downstream of, said third heat exchanger or evaporator (27);
the waste heat dissipation and recovery system (35) further comprising:
a further heat exchanger (39) for transferring, to a fluid, at least a part of the heat which has been removed by said first heat exchanger (38);
moving means (40) for forcedly making said fluid circulate through said further exchanger (39);
a bypass pipe (41) arranged in parallel to said second exchanger (28); and
a three-way regulating valve (42) controlled so as to adjust the heat exchanged by said second exchanger (28) by splitting the flow rate of said heat transfer fluid between said second exchanger (28) and said bypass pipe (41);
wherein said further exchanger (39) is arranged in series with, and downstream of, said second exchanger (28) and said bypass pipe (41) and upstream of said first exchanger (38).

2. The vehicle according to claim 1, wherein said air conditioning system (15) comprises at least one control unit (16) configured to simultaneously adjust said refrigerating assembly (30) and said waste heat dissipation and recovery system (35), in order to achieve a temperature setpoint and also a relative humidity setpoint, in said passenger compartment (11).

3. The vehicle according to claim 2, wherein said control unit (16) is configured to adjust:
the refrigerating assembly (30) in such a manner that the third exchanger or evaporator (27) removes a greater heat quantity than it would theoretically be necessary to achieve the temperature setpoint only, if the second exchanger (28) did not release any heat quantity; and
the waste heat dissipation and recovery system (35) in such a manner that the second exchanger (28) releases a heat quantity to the cooled air so that the temperature setpoint and the relative humidity setpoint are simultaneously achieved.

4. The vehicle according to claim 1, wherein said air conditioning system (15) comprises at least one control unit configured to increase a speed of said moving means (40) upon the increase in a forward speed of the vehicle.

5. The vehicle according to claim 1, wherein said air conditioning system (15) comprises at least one control unit configured to adjust the heat removed through said further exchanger (39), by varying a speed of said moving means (40) and/or by bypassing said further exchanger (39).

6. The vehicle according to claim 5, wherein the control unit is configured to adjust the heat removed through said further exchanger (39) to achieve a given temperature setpoint in the passenger compartment.

7. The vehicle according to claim 5, wherein said control unit is configured to reduce the speed of said moving means (40) after said regulating valve (42) has been set so as to make all the heat transfer fluid flow through said second exchanger (28).

8. The vehicle according to claim 7, wherein said control unit is configured to bypass said further exchanger (39) after the speed of said moving means (40) has been annulled.

9. The vehicle according to claim 5, wherein said control unit is configured to reduce the speed of said moving means (40) and/or bypass said further exchanger (39) only if the temperature of the heat transfer fluid at said first exchanger (38) does not exceed a threshold value.

10. The vehicle according to claim 1, wherein said electrical and/or electronic component (8) is defined by at least one power electronic converter (10).

11. The vehicle according claim 1, wherein said refrigerating assembly (30) further comprises:
a second circuit (31), in which a refrigerant fluid flows, in use;
a fourth heat exchanger or condenser (33) for transferring heat to the outside;
a compressor (32); and
a lamination valve (34).

* * * * *